(12) United States Patent
Deluca et al.

(10) Patent No.: US 9,842,297 B1
(45) Date of Patent: Dec. 12, 2017

(54) ESTABLISHING INDUSTRY GROUND TRUTH

(71) Applicant: INTERNATIONAL BUSINESS MACHINES CORPORATION, Armonk, NY (US)

(72) Inventors: Lisa Seacat Deluca, Baltimore, MD (US); Keith L. Vertrees, Richmond, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/280,332

(22) Filed: Sep. 29, 2016

(51) Int. Cl.
  *G06F 17/30* (2006.01)
  *G06N 5/02* (2006.01)
  *G06N 99/00* (2010.01)

(52) U.S. Cl.
  CPC ......... *G06N 5/022* (2013.01); *G06F 17/3053* (2013.01); *G06F 17/30598* (2013.01); *G06F 17/30864* (2013.01); *G06N 99/005* (2013.01)

(58) Field of Classification Search
  CPC .......... G06F 17/3053; G06F 17/30864; G06N 99/005
  USPC ....................................................... 707/706
  See application file for complete search history.

(56) References Cited

U.S. PATENT DOCUMENTS

| | | | | |
|---|---|---|---|---|
| 6,778,979 | B2 * | 8/2004 | Grefenstette | G06F 17/30643 |
| 7,409,336 | B2 * | 8/2008 | Pak | G10L 15/1822 |
| | | | | 704/10 |
| 9,317,608 | B2 * | 4/2016 | Hess | G06F 17/30864 |
| 9,465,862 | B2 * | 10/2016 | Agrawal | G06F 17/30616 |
| 2008/0114755 | A1 | 5/2008 | Wolters et al. | |
| 2012/0158685 | A1 | 6/2012 | White et al. | |
| 2014/0358889 | A1 * | 12/2014 | Shmiel | G06F 17/30654 |
| | | | | 707/710 |
| 2015/0142827 | A1 | 5/2015 | Hasan et al. | |
| 2015/0154689 | A1 * | 6/2015 | Fitzpatrick | G06Q 30/0641 |
| | | | | 705/27.1 |

OTHER PUBLICATIONS

Mell, Peter, et al., "The NIST Definition of Cloud Computing", NIST Special Publication 800-145, Sep. 2011, Gaithersburg, MD, 7 pgs.
Watson Developer Cloud, "Retrieve and Rank service documentation", [retrieved Sep. 23, 2016]. Retrieved from the Internet: <URL: http://www.ibm.com/watson/developercloud/doc/retrieve-rank/training_data.shtml>, Sep. 7, 2016, 14 pgs.

* cited by examiner

*Primary Examiner* — Miranda Le
(74) *Attorney, Agent, or Firm* — Isaac J. Gooshaw; Hye Jin Lucy Song; Heslin Rothenberg Farley & Mesiti PC (57) ABSTRACT

Methods, computer program products, and systems are presented. The methods include, for instance: determining a category of a domain having content documents and gathering search terms frequently used in similar domains associated with the category. A ground truth table has domain search results as discovered from searches by use of the search terms from the similar domains. Ground truths are utilized in later searches for optimal search results.

14 Claims, 6 Drawing Sheets

ESTABLISHING INDUSTRY GROUND TRUTH

TECHNICAL FIELD

The present disclosure relates to network domain content processing, and more particularly to methods, computer program products, and systems for establishing training data for content mining and searching for an industry.

BACKGROUND

Ground truths are utilized in e-commerce applications to provide prioritized search results for specific queries in order to induce more traffic and to generate more sales. Conventionally, the ground truths for a new domain are established from scratch over time based on cumulated search inquiries and results.

SUMMARY

The shortcomings of the prior art are overcome, and additional advantages are provided, through the provision, in one aspect, of a method. The method for building a ground truth table includes, for example: determining, by one or more processor of a computer, a category of a domain having content documents; selecting one or more similar domains associated with the category of the domain; identifying one or more search terms frequently used in the similar domains; performing a first domain search in the domain by use of a first search term of the one or more search terms from the identifying; adding, to a ground truth table, a first ground truth as generated based on a first result corresponding to the first domain search; and producing the ground truth table for later searches of the domain such that the later searches may be optimally performed by use of the ground truth table.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
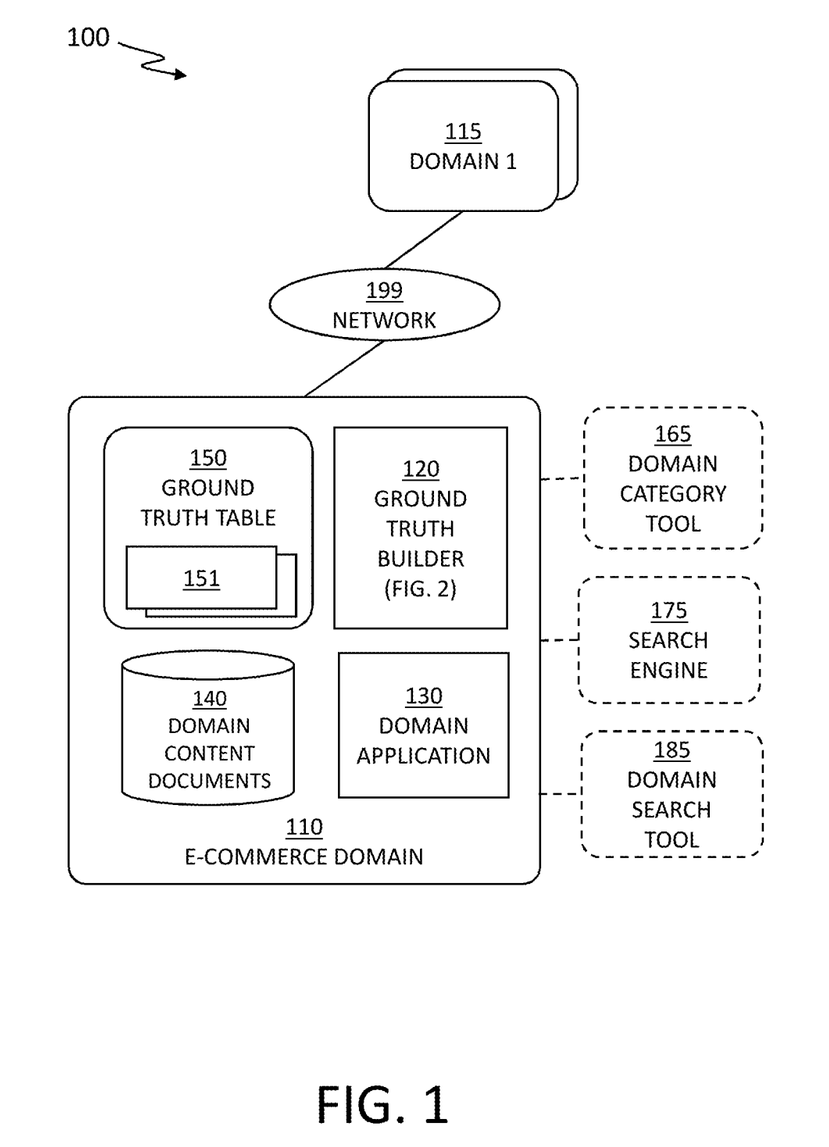
FIG. 1 depicts a system 100 for establishing ground truth, in accordance with one or more embodiments set forth herein.

FIG. 1 depicts a system 100 for establishing ground truth, in accordance with one or more embodiments set forth herein.

The system 100 includes an e-commerce domain 110 and one or more domains 115 coupled via a network 199. In this specification, the term "domain" indicates a subset of the Internet such as a webdomain, mobile app, etc. The e-commerce domain 110 includes a ground truth builder 120, a domain application 130, and a domain content documents 140. The ground truth builder 120 generates a ground truth table 150 having one or more ground truths 151 in order to improve search results for the e-commerce domain by use of user cognitive technologies. In this specification, the term "ground truth table" indicates a collection of one or more ground truths in accessible format, and does not indicate any particular data structure. The ground truths 151 are generally utilized to create training data for search optimization based on machine learning.

In the ground truth table 150, each ground truth 151 has a question, one or more answers for the question, and relevance scores respectively associated with each answer. Accordingly, the ground truths 151 may be utilized to return a more relevant and optimized search result to a real-time search inquiry by a user of the e-commerce domain 110. Examples of the ground truths 151 are presented in FIG. 2 and corresponding description.

The ground truths 151 of the ground truth table 150 may be provided to search inquiries over the network 199 for machine learning of search rankings. By use of the ground truth builder 120, the e-commerce domain 110 efficiently establishes the ground truth table 150. Detailed operations of the ground truth builder 120 are presented in FIG. 2 and corresponding description.

The e-commerce domain 110 may have or be coupled to tools including a domain category tool 165, a search engine 175, and a domain search tool 185. The domain category tool 165 may be utilized to categorize the e-commerce domain 110 as a member of a particular industry, or a type from many categories. For example, if the e-commerce domain 110 is titled as "Mike's Bikes", then the domain category tool 165 may determine an industry of the e-commerce domain 110 as a recreational and sporting bicycle industry from the title. In one embodiment of the present invention, the domain category tool 165 may be a combination of screen scraping and IBM Watson™ Natural Language Classifier service, with which words of the domain content documents 140 are harvested by screen scraping and the harvested words are analyzed by the IBM Watson Natural Language Classifier service. (IBM is a registered trademark of International Business Machines Corporation in the United States and other countries; IBM Watson is a trademark of International Business Machines Corporation in the United States and other countries.) The e-commerce domain 110 may also have associated industry information specified in the domain content documents 140.

The one or more domains 115 are pre-existing e-commerce domains categorized as a similar industry as the e-commerce domain 110. In one embodiment of the present invention, the one or more domains 115 may be discovered by the search engine 175. Further by use of the search engine 175, the ground truth builder 120 obtains search terms that are frequently used in the one or more domains 115, in order to efficiently build the ground truth table 150. The domain search tool 185 may be utilized for a domain search within the e-commerce domain 110.

Figure 2:
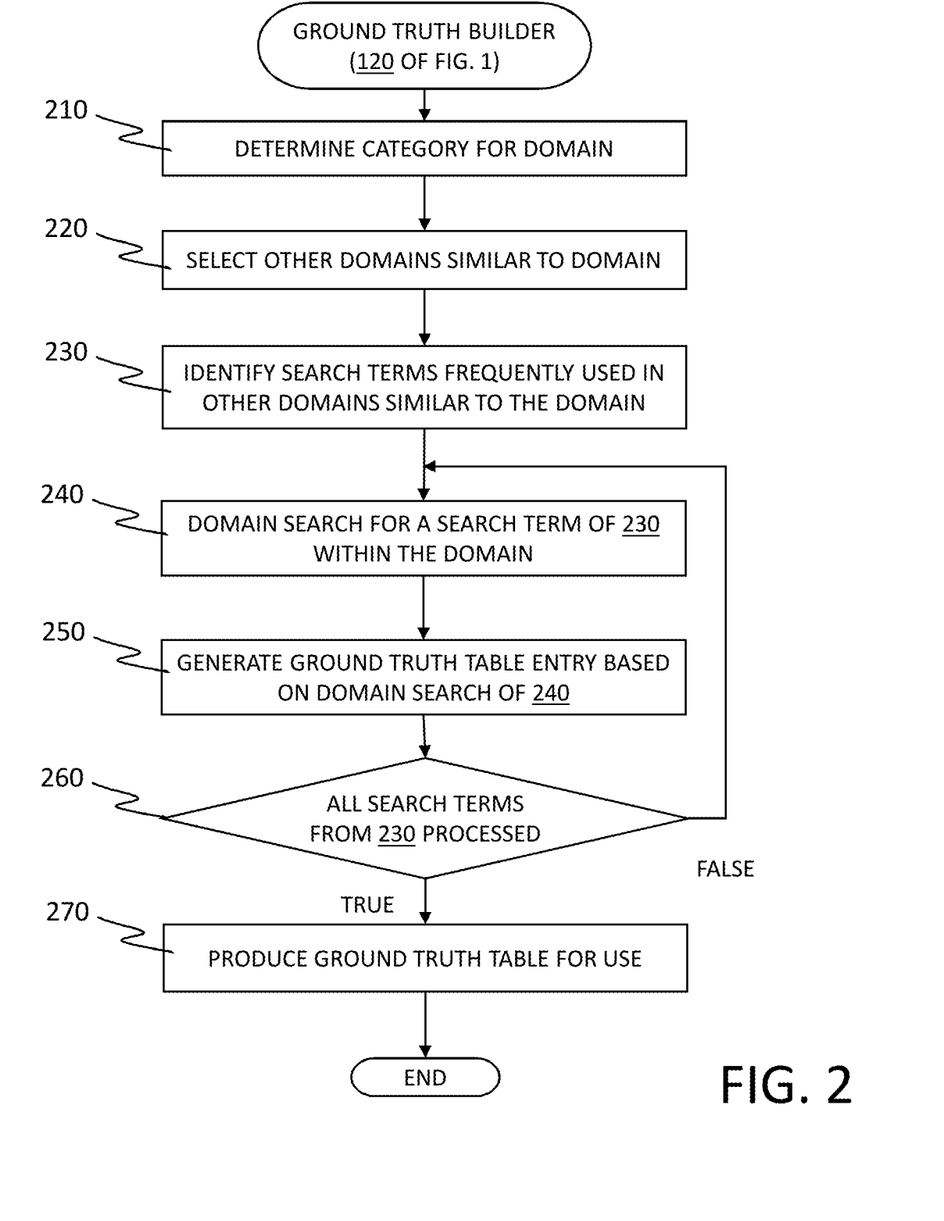
FIG. 2 depicts a flowchart performed by the ground truth builder, in accordance with one or more embodiments set forth herein.

FIG. 2 depicts a flowchart performed by the ground truth builder 120 of FIG. 1, in accordance with one or more embodiments set forth herein.

In block 210, the ground truth builder 120 determines a category/industry of a new e-commerce domain. Then the ground truth builder 120 proceeds with block 220.

As previously noted, in one embodiment of the present invention, the category, or more specifically, the industry of the e-commerce domain may be determined by use of screen scraping on the domain content documents and natural language classification of results from the screen scraping. In other embodiment of the present invention, the category/industry may be manually configured for the ground truth builder 120 by a programmer/system administrator.

In block 220, the ground truth builder 120 selects other pre-existing domains in the category/industry same as the new e-commerce domain as determined from block 210. Then the ground truth builder 120 proceeds with block 230.

In block 230, the ground truth builder 120 identifies search terms frequently used from the pre-existing domains as selected from block 220. Then the ground truth builder 120 proceeds with block 240.

In one embodiment of the present invention, the search engine 175 such as IBM Blekko® may be utilized in block 230 for identifying frequent search terms for other domains in the same category/industry. (Blekko is a registered trademark of International Business Machines Corporation in the United States and other countries.) For example, wherein search histories of the search engine 175 are made available from the other industry domains selected from block 220, the ground truth builder 120 may extract the frequent search terms from the search histories available.

In block 240, the ground truth builder 120 performs a domain search against domain content documents of the e-commerce domain by use of one for the search terms identified from block 230. Then the ground truth builder 120 proceeds with block 250.

An example of the domain search tool 185 used for the domain search may include, but not limited to, Apache Solr™, etc. (Apache and Apache Solr are trademarks of the Apache Software Foundation in the United States and other countries.)

In block 250, the ground truth builder 120 inserts a ground truth, also referred to as a ground truth table entry, to a ground truth table as generated based on the search performed in block 240. As noted in description of FIG. 1, each ground truth, or ground truth table entry, has a question, one or more answers for the question, and relevance scores respectively associated with each answer. Ground truths, or ground truth table entries, are identified by the question within the ground truth table. Then the ground truth builder 120 proceeds with block 260.

In the same embodiment of the present invention, in which the e-commerce domain 110 is titled as "Mike's Bikes", an exemplary ground truth table may have two (2) ground truth table entries, or ground truths. A first ground truth may be {"What are the most durable Mountain Bikes?", 015490, "1", 020373, "2", 073446, "3", 055231, "4", 047285, "2", . . . }, wherein "What are the most durable Mountain Bikes?" is a question, 015490 is a first answer associated with a relevance score "1", 020373 is a second answer associated with a relevance score "2", 073446 is a third answer associated with a relevance score "3", 055231 is a fourth answer associated with a relevance score "4", 047285 is a fifth answer associated with a relevance score "2", and more answers and respectively associated relevance scores not presented in the first ground truth. A second ground truth may be {"What Mountain Bikes are the most affordable?", 015490, "2", 020373, "4", 073446, "2", 055231, "1", 047285, "3" . . . }, wherein "What Mountain Bikes are the most affordable?" is a question of the second ground truth, 015490 is a first answer associated with a relevance score "2", 020373 is a second answer associated with a relevance score "4", 073446 is a third answer associated with a relevance score "2", 055231 is a fourth answer associated with a relevance score "1", 047285 is a fifth answer associated with a relevance score "3", and more answers and respectively associated relevance scores not presented in the second ground truth. Answers in both ground truths represent respective product identification codes that have been resulted from a search query in the respective question of each ground truth, and respective relevance scores indicate how relevant each answer to the question. In this example, the product identification codes may be associated with four (4) levels of relevance scores wherein "1" is the lowest relevance score, indicating that the answer is not relevant to the question at all, and "4" is the highest relevance score, indicating the most relevant answer to the question of the ground truth. Accordingly, the answers having respective relevance score "4" are typically presented at the top, followed by answers associated with decreasing order of relevance scores, and the answers having respective relevance score "1" are not presented in a search result of the question as irrelevant answers.

In block 260, the ground truth builder 120 determines if all search terms identified in block 230 had been searched against the domain content documents of the e-commerce domain from block 240. If the ground truth builder 120 determines that there is a search term identified in block 230 that had not been searched against the domain content documents of the e-commerce domain in block 240, then the ground truth builder 120 loops back to block 240 to perform another domain search for a next search term. If the ground truth builder 120 determines that all search terms identified in block 230 had been searched against the domain content documents of the e-commerce domain in block 240, then the ground truth builder 120 proceeds with block 270.

In block 270, the ground truth builder 120 produces the ground truth table 150 of the e-commerce domain 110 such that the ground truth table 150 may be utilized in responding to various searches for search engine training and domain ranking. Then the ground truth builder 120 terminates.

In the same embodiment of the present invention as presented in block 250, when a natural language search query "Tough Mountain Bike" is presented to the e-commerce domain 110, the domain search tool 185 looks up the ground truth table 150, matches the question with the question of the first ground truth "What are the most durable Mountain Bikes?", and returns answers of the second ground truth in order of respective relevance scores from "4" to "2", that is, 055231, 073446, 020373, and 047285, and respectively related descriptions and links as configured by the e-commerce domain 110 and/or the domain search tool 185.

Figure 3:
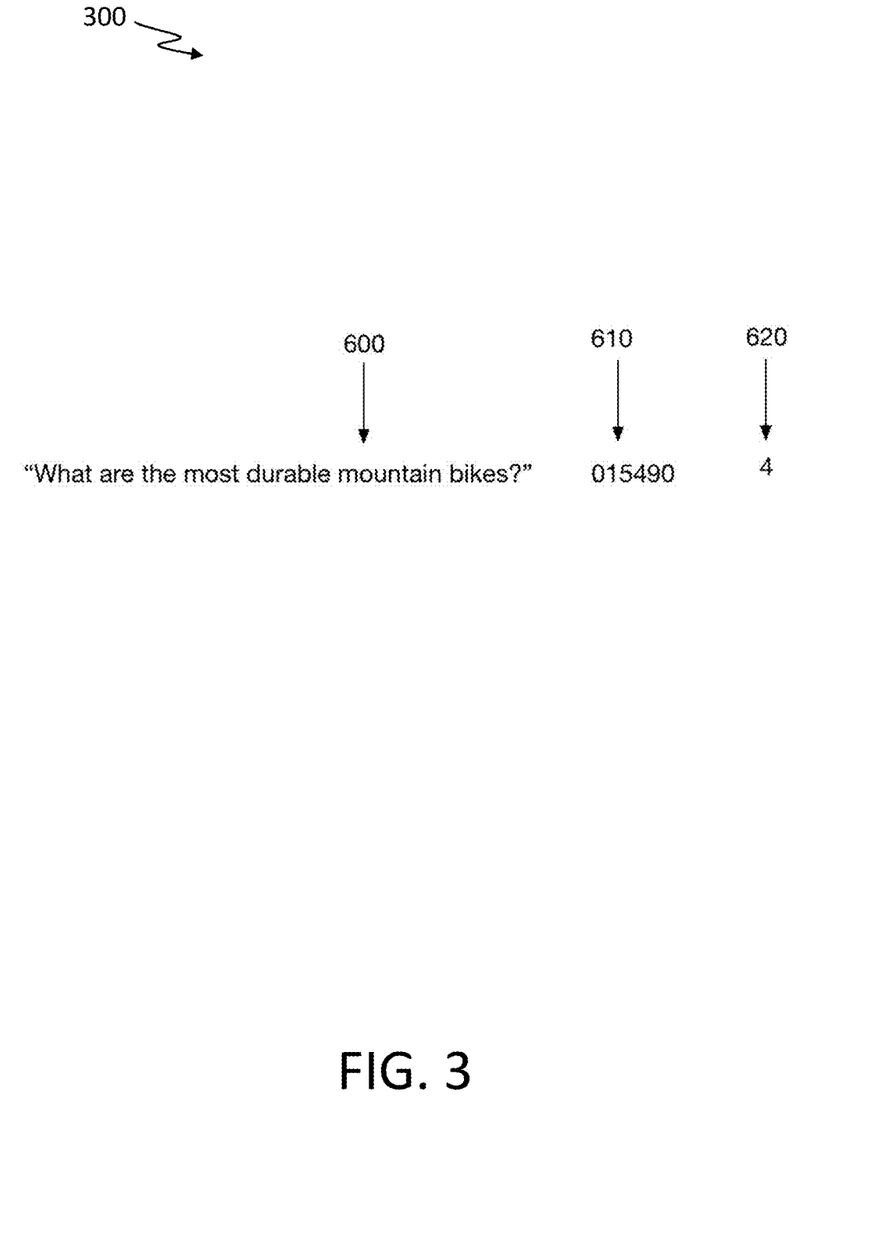
FIG. 3 depicts an exemplary ground truth table as generated by the ground truth builder, in accordance with one or more embodiments set forth herein.

FIG. 3 depicts an exemplary ground truth table as generated by the ground truth builder 120, in accordance with one or more embodiments set forth herein.

A ground truth 300 includes a search query 600 "What are the most durable Mountain bikes?" which had been identified from popular searches on similar domains in a same industry as the e-commerce domain. The ground truth 300 includes "015490" 610, which is a product identifier resulting from running the search query 600 against the domain content documents of the e-commerce domain. Within the ground truth 300, a relevancy "4" 620 indicates that the product identifier "015490" 610 is most highly relevant to the search query 600.

Certain embodiments of the present invention may offer various technical computing advantages, including expedited and automated ground truth production for generating optimized search results of a domain. Certain embodiments of the present invention implement an expedited process of building the ground truths by use of a cognitive approach in identifying preexisting domains in a same industry and utilizing frequent search terms of the preexisting domains. Consequently, reliable ground truths may be established instantly where search information of industry domains are available.

Figure 4:
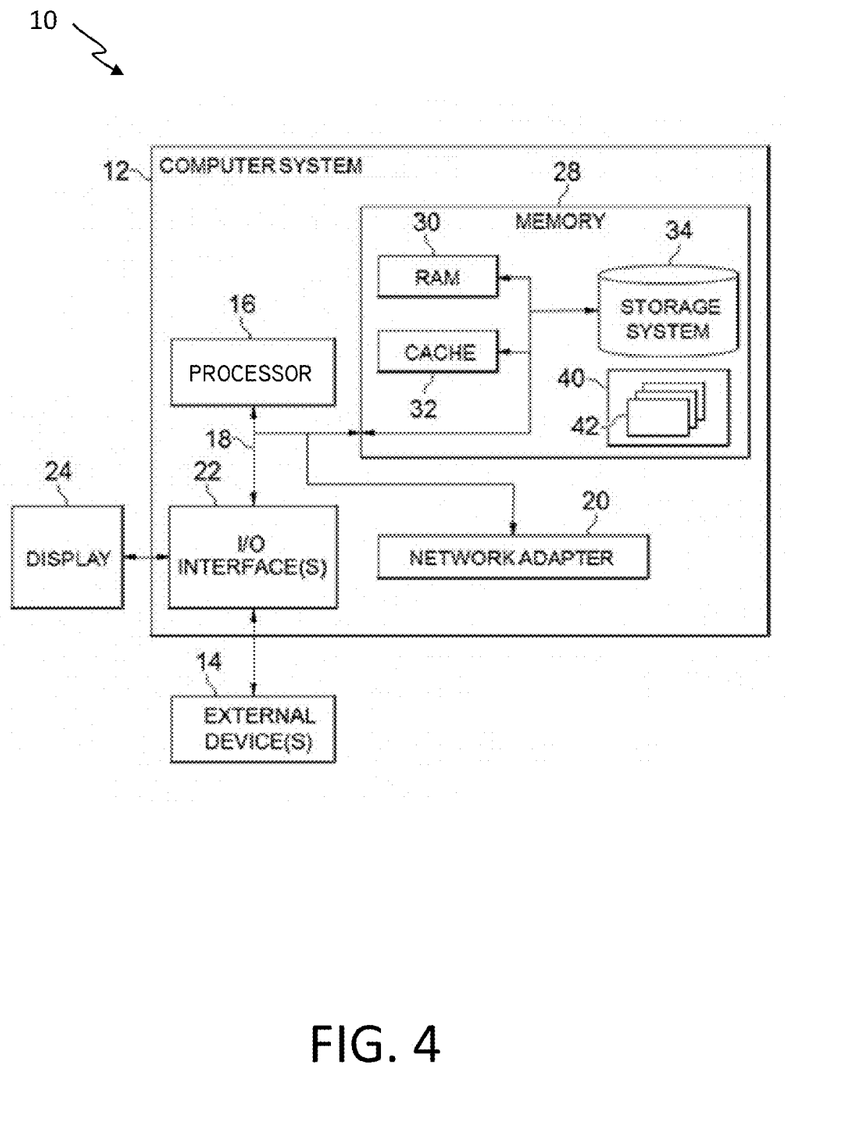
FIG. 4 depicts a cloud computing node according to an embodiment of the present invention.
Figure 5:
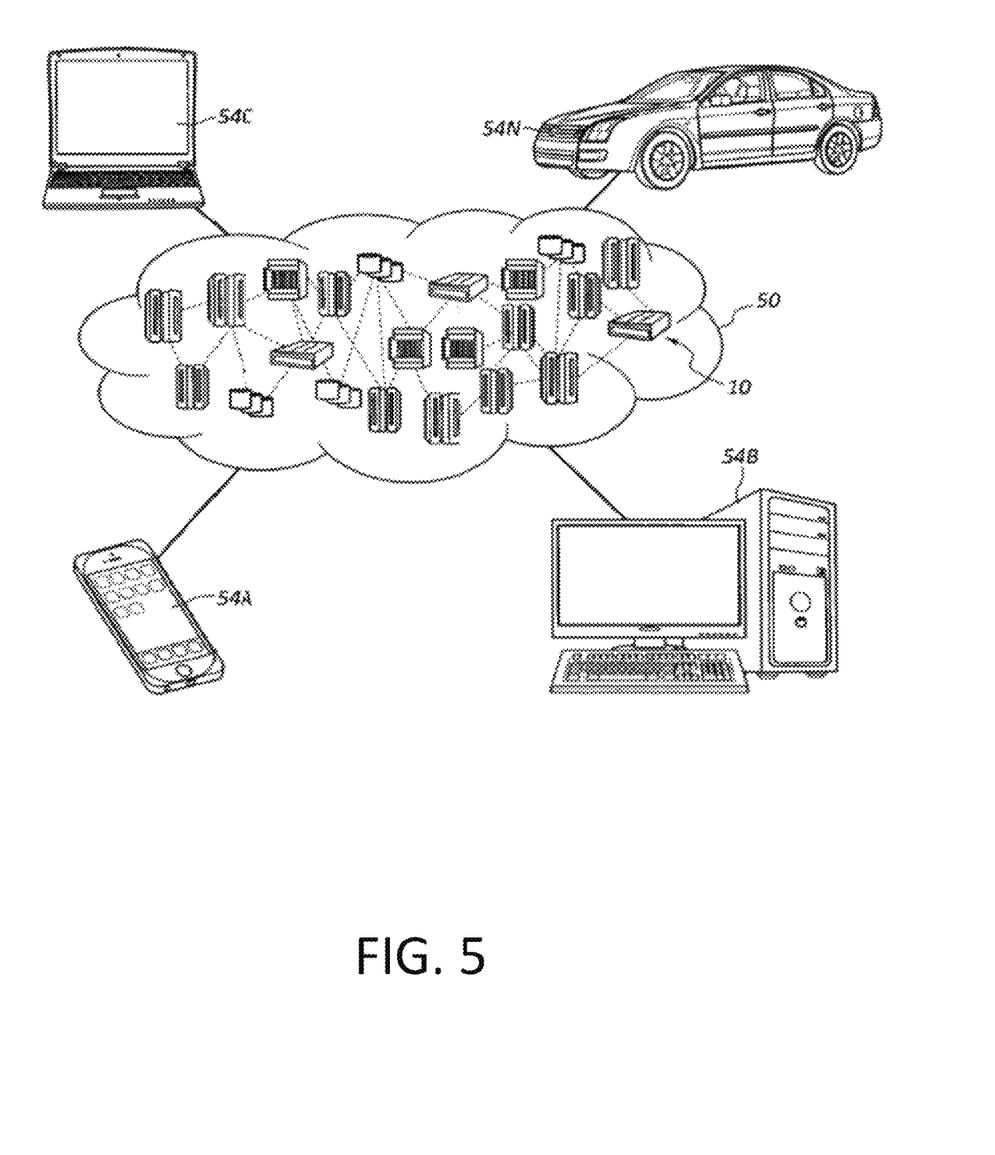
FIG. 5 depicts a cloud computing environment according to an embodiment of the present invention.
Figure 6:
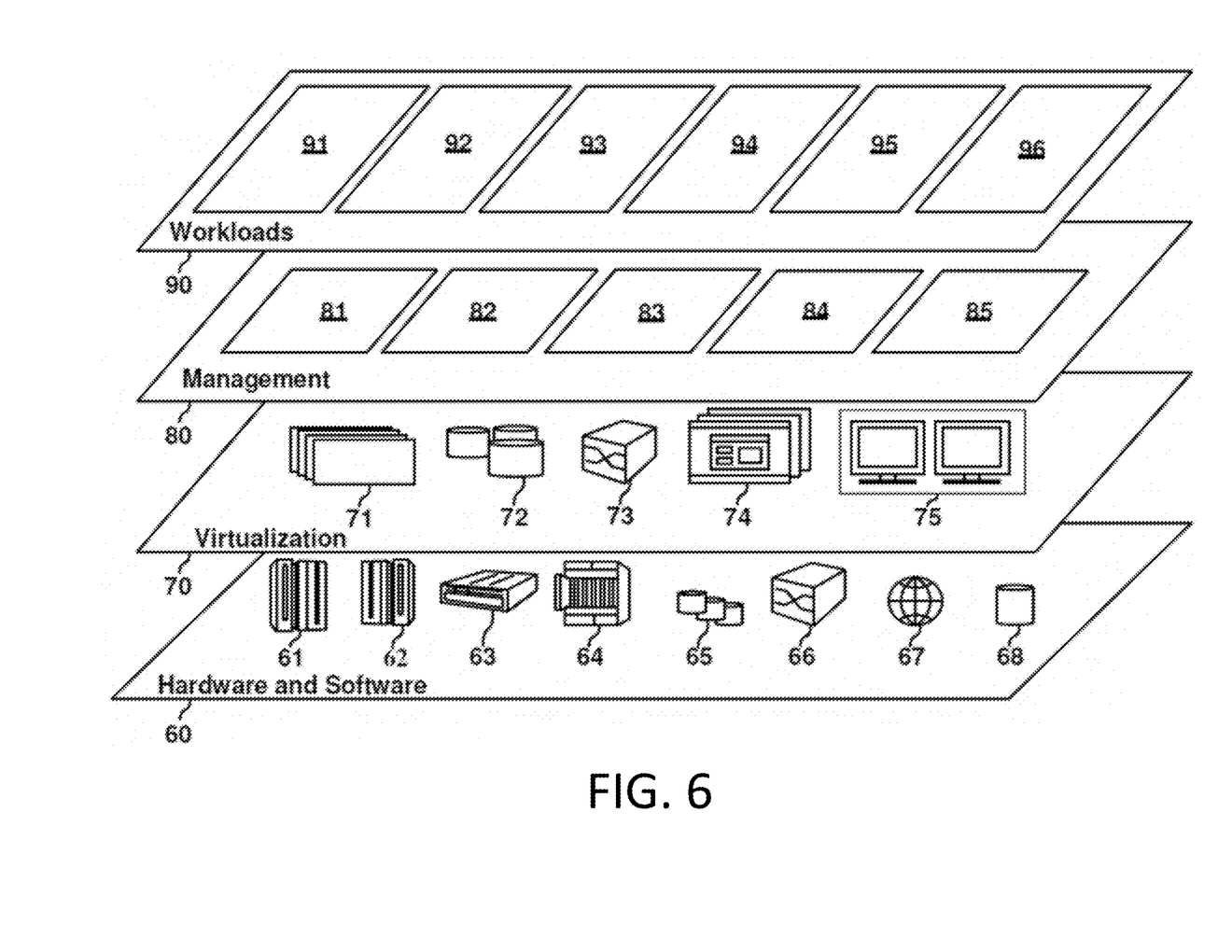
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the ground truth builder 120 of FIG. 1. Program processes 42, as in the ground truth builder 120, the domain application 130, the domain category tool 165, the search engine 175, and the domain search tool 185, of FIG. 1, respectively, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the ground truth builder 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for building a ground truth table, comprising:

determining, by one or more processor of a computer, a category of a uniquely identified domain having content documents;

selecting one or more similar domains associated with the category of the domain;

identifying one or more search terms frequently used in the similar domains;

performing a first domain search in the domain by use of a first search term of the one or more search terms from the identifying;

adding, to a ground truth table, a first ground truth as generated based on a first result corresponding to the first domain search, responsive to creating the first ground truth comprising the first search term indicating a search inquiry, one or more answer to the search inquiry as being discovered from the content documents of the domain, and one or more relevance score respectively associated with each of the one or more answer discovered from the domain, wherein the relevance score is selected from a predefined number of levels of relevance indicating how responsive each of the one or more answer is to the search inquiry, wherein the relevance score is selected from the group consisting three (3) or more levels of relevance of each of the one or more answer to the search inquiry, wherein the one or more answer associated with a highest level of relevance is presented first, wherein the rest of answer from the one or more answer associated with one or more lower level of relevance is presented in a decreasing order of respective relevance scores, and wherein the one or more answer associated with a lowest level of relevance is not presented in the ground truth table for the search inquiry as being irrelevant; and producing the ground truth table for later searches of the domain such that the later searches may be optimally performed by use of the ground truth table.

2. The computer implemented method of claim 1, the determining comprising:

harvesting words of the content documents of the domain; and ascertaining the category of the domain responsive to analyzing the words from the harvesting by use of a natural language analysis tool.

3. The computer implemented method of claim 2, wherein the category is an industry class, wherein the domain operates an e-commerce application, and wherein the content documents of the domain stores data on merchandise for sales on the domain.

4. The computer implemented method of claim 1, the identifying comprising:

obtaining a search history comprising the one or more search terms from one of the similar domains by use of a search engine; and extracting the one or more search terms from the search history.

5. The computer implemented method of claim 1, further comprising:

presenting a second ground truth from the ground truth table in response to a new search of the domain, wherein a search inquiry of the second ground truth is close to the new search inquiry, and wherein one or more answer of the second ground truth are presented in descending order of respective relevance score of the one or more answer, from an answer corresponding to the highest relevance score.

6. A computer program product comprising:

a computer readable storage medium readable by one or more processor and storing instructions for execution by the one or more processor for performing a method for building a ground truth table, comprising:

determining, by the one or more processor, a category of a domain having content documents;

selecting one or more similar domains associated with the category of the domain;

identifying one or more search terms frequently used in the similar domains;

performing a first domain search in the domain by use of a first search term of the one or more search terms from the identifying;

adding, to a ground truth table, a first ground truth as generated based on a first result corresponding to the first domain search, responsive to creating the first ground truth comprising the first search term indicating a search inquiry, one or more answer to the search inquiry as being discovered from the content documents of the domain, and one or more relevance score respectively associated with each of the one or more answer discovered from the domain, wherein the relevance score is selected from a predefined number of levels of relevance indicating how responsive each of the one or more answer is to the search inquiry, wherein the relevance score is selected from the group consisting three (3) or more levels of relevance of each of the one or more answer to the search inquiry, wherein the one or more answer associated with a highest level of relevance is presented first, wherein the rest of answer from the one or more answer associated with one or more lower level of relevance is presented in a decreasing order of respective relevance scores, and wherein the one or more answer associated with a lowest level of relevance is not presented in the ground truth table for the search inquiry as being irrelevant; and producing the ground truth table for later searches of the domain such that the later searches may be optimally performed by use of the ground truth table.

7. The computer program product of claim 6, the determining comprising:

harvesting words of the content documents of the domain; and ascertaining the category of the domain responsive to analyzing the words from the harvesting by use of a natural language analysis tool.

8. The computer program product of claim 7, wherein the category is an industry class, wherein the domain operates an e-commerce application, and wherein the content documents of the domain stores data on merchandise for sales on the domain.

9. The computer program product of claim 6, the identifying comprising:

obtaining a search history comprising the one or more search terms from one of the similar domains by use of a search engine; and extracting the one or more search terms from the search history.

10. The computer program product of claim 6, further comprising:

presenting a second ground truth from the ground truth table in response to a new search of the domain, wherein a search inquiry of the second ground truth is close to the new search inquiry, and wherein one or more answer of the second ground truth are presented in descending order of respective relevance score of the one or more answer, from an answer corresponding to the highest relevance score.

11. A system comprising:
a memory;
one or more processor in communication with memory; and program instructions executable by the one or more processor via the memory to perform a method for building a ground truth table, comprising:

determining, by the one or more processor, a category of a domain having content documents;

selecting one or more similar domains associated with the category of the domain;

identifying one or more search terms frequently used in the similar domains;

performing a first domain search in the domain by use of a first search term of the one or more search terms from the identifying;

adding, to a ground truth table, a first ground truth as generated based on a first result corresponding to the first domain search, responsive to creating the first ground truth comprising the first search term indicating a search inquiry, one or more answer to the search inquiry as being discovered from the content documents of the domain, and one or more relevance score respectively associated with each of the one or more answer discovered from the domain, wherein the relevance score is selected from a predefined number of levels of relevance indicating how responsive each of the one or more answer is to the search inquiry, wherein the relevance score is selected from the group consisting three (3) or more levels of relevance of each of the one or more answer to the search inquiry, wherein the one or more answer associated with a highest level of relevance is presented first, wherein the rest of answer from the one or more answer associated with one or more lower level of relevance is presented in a decreasing order of respective relevance scores, and wherein the one or more answer associated with a lowest level of relevance is not presented in the ground truth table for the search inquiry as being irrelevant; and producing the ground truth table for later searches of the domain such that the later searches may be optimally performed by use of the ground truth table.

12. The system of claim 11, the determining comprising:
harvesting words of the content documents of the domain; and ascertaining the category of the domain responsive to analyzing the words from the harvesting by use of a natural language analysis tool, wherein the category is an industry class, wherein the domain operates an e-commerce application, and wherein the content documents of the domain stores data on merchandise for sales on the domain.

13. The system of claim 11, the identifying comprising:
obtaining a search history comprising the one or more search terms from one of the similar domains by use of a search engine; and extracting the one or more search terms from the search history.

14. The system of claim 11, further comprising:
presenting a second ground truth from the ground truth table in response to a new search of the domain, wherein a search inquiry of the second ground truth is close to the new search inquiry, and wherein one or more answer of the second ground truth are presented in descending order of respective relevance score of the one or more answer, from an answer corresponding to the highest relevance score.

* * * * *